(12) United States Patent
Holt et al.

(10) Patent No.: US 8,240,689 B2
(45) Date of Patent: Aug. 14, 2012

(54) IN-WHEEL SUSPENSION SYSTEM WITH REMOTE SPRING AND DAMPER MEANS

(75) Inventors: Laurence J Holt, Uxbridge (CA); Thomas Alexander Sparrow, Toronto (CA)

(73) Assignee: Multimatic, Inc., Markham (CA)

( * ) Notice: Subject to any disclaimer, the term of this patent is extended or adjusted under 35 U.S.C. 154(b) by 49 days.

(21) Appl. No.: 12/739,763

(22) PCT Filed: Oct. 21, 2008

(86) PCT No.: PCT/CA2008/001856
§ 371 (c)(1),
(2), (4) Date: Apr. 26, 2010

(87) PCT Pub. No.: WO2009/052612
PCT Pub. Date: Apr. 30, 2009

(65) Prior Publication Data
US 2010/0259025 A1    Oct. 14, 2010

(30) Foreign Application Priority Data
Oct. 26, 2007  (CA) ..................................... 2608825

(51) Int. Cl.
*B60G 3/01*        (2006.01)
(52) U.S. Cl. .............................................. 280/124.127
(58) Field of Classification Search ............. 280/93.512, 280/124.1, 124.125, 124.126, 124.127; 188/314, 188/318
See application file for complete search history.

(56) References Cited

U.S. PATENT DOCUMENTS
3,578,354 A    5/1971 Schott
(Continued)

FOREIGN PATENT DOCUMENTS
WO         9304883 A1    3/1993
(Continued)

OTHER PUBLICATIONS
"PCT International Search Report dated Jan. 13, 2009 for PCT/CA2008/001856, from which the instant application is based," 3 pgs.
(Continued)

*Primary Examiner* — Paul N Dickson
*Assistant Examiner* — Robert A Coker
(74) *Attorney, Agent, or Firm* — Fredrikson & Byron, PA

(57) ABSTRACT

A vehicle suspension system (55) is configured so as to contain all of the suspension motion control elements completely within the volume of the road wheel (100) while remotely locating the energy storage device (45) and damping device (42). An upright (60) comprises the spindle (61), brake caliper (105), and structure to hold a main strut shaft (70) parallel to a secondary strut shaft (67). The suspension's motion is controlled by the shafts which slide relative to the sprung part of the vehicle (1). The main strut shaft (70) includes a pumping piston (73). The fluid (91) displaced by the pumping piston (73) flows through a hydraulic connection (47) to a remote suspension module (40) mounted to the sprung part of the vehicle. The remote suspension module (40) hydraulically transmits the wheel motion to the remote energy storage device (45) and damping device (42). A steering arm (95) rotating around the main strut shaft (70) is configured to allow both struts (70 and 67) to slide through it, thus eliminating bump steer.

14 Claims, 11 Drawing Sheets

U.S. PATENT DOCUMENTS

| | | | |
|---|---|---|---|
| 6,113,119 A | 9/2000 | Laurent et al. | |
| 6,257,604 B1 * | 7/2001 | Laurent et al. | 280/124.127 |
| 6,357,770 B1 | 3/2002 | Carpiaux et al. | |
| 7,389,999 B2 * | 6/2008 | Kimura et al. | 280/93.512 |
| 7,699,326 B2 * | 4/2010 | Yamada | 280/86.75 |
| 2005/0263361 A1 | 12/2005 | Schulz et al. | |
| 2006/0237942 A1 | 10/2006 | Munday et al. | |

FOREIGN PATENT DOCUMENTS

| | | |
|---|---|---|
| WO | 2006040017 A1 | 4/2006 |

OTHER PUBLICATIONS

"PCT International Report on Patentability dated Feb. 10, 2010 for PCT/CA2008/001856, from which the instant application is based," 7 pgs.

Disclosure of In-Wheel Suspension at Specialty Equipment Market Association ("SEMA") Show in Las Vegas, Nevada, USA, on Oct. 30, 2007 [retrieved on Jan. 13, 2009]. Retrieved from the Internet: <URL: http://www.multimatic.com/pressreleases/301007.shtml>; <URL: http://www.multimatic.com/pdf/m132herocard.pdf>.

* cited by examiner

IN-WHEEL SUSPENSION SYSTEM WITH REMOTE SPRING AND DAMPER MEANS

RELATED APPLICATIONS

This application is a 35 U.S.C. 371 national stage filing from International Application No. PCT/CA2008/001856 filed Oct. 21, 2008, which claims priority to Canadian Patent Application No. 2,608,825, filed Oct. 26, 2007, the teachings of which are incorporated herein by reference.

FIELD OF THE INVENTION

This invention relates to a suspension system for wheeled vehicles.

BACKGROUND OF THE INVENTION

The suspension system of a vehicle is primarily provided to isolate the occupant compartment from road irregularities. However, suspension also plays an important role in reducing the amount of energy expended as the vehicle encounters bumps in its path. The most common approach to vehicle suspension is to provide an articulating linkage that allows the tire, wheel, brake assembly, bearing arrangement and associated structural member to move independently, but in a predetermined manner relative to the main vehicle structure. The subassembly of tire, wheel, brake assembly, bearing arrangement and associated structure is generally referred to as the unsprung mass while the main vehicle structure, including the occupant compartment is termed the sprung mass. When the vehicle encounters a bump the articulating linkage allows the unsprung mass to move up and over it. A spring is provided to store the imparted energy which is used to restore the unsprung mass to its predisturbed state. It is also common practice to provide a damper or shock absorber to control the oscillatory nature of the spring-mass system so that it is expeditiously brought to rest. In this way the vehicle can be simply considered a five mass system consisting of a single, large sprung mass (1) and four independent unsprung masses (3) as shown schematically in FIG. 1.

The motion of each unsprung mass is determined by the geometry of the associated articulated linkage that connects the unsprung mass structural member to the main vehicle structure. A combination of independent links and appropriately restrained connection joints results in an overall system motion that is generally limited to being fully controlled by the spring and damper. The most common articulated linkages associated with independent unsprung mass suspension systems can be categorized as double 'A' arm (FIG. 2), MacPherson strut (FIG. 3) and multi-link (FIG. 4).

The double 'A' arm configuration illustrated schematically in FIG. 2 consists of a relatively simple four bar link arrangement made up of the main vehicle structure (1) (not shown in FIG. 2), an upper control arm (10), a lower control arm (11) and a structural member or upright (12) that is adapted to carry all of the unsprung mass components such as the tire, wheel, brake assembly and bearing arrangement. Each of the connection joints is configured to constrain all but a single rotary degree of freedom which results in a single translational degree of freedom motion of the upright (12) that is in turn controlled by a coil spring (13) and conventional hydraulic damper (14). Additional complexity is typically introduced with the use of multiple degree of freedom compliance at each joint in the interest of adding additional isolation to the main vehicle structure (1). These compliances are typically provided by rubber bushings that return spring stiffness and damping in all three translational degrees of freedom. The stiffness of these rubber bushings is typically very high in comparison to that of the coil spring (13).

FIG. 3 schematically illustrates a MacPherson strut arrangement that consists of a lower control arm (22), a structural member or upright (23) that is adapted to carry all of the unsprung mass components such as the tire, wheel, brake assembly and bearing arrangement and a strut (24) that is rigidly attached to the upright and provides a linear motion control as well as containing a conventional hydraulic damper. The lower control arm joints are configured to constrain all but a single rotary degree of freedom while the upper strut mount releases two rotary degrees of freedom. This configuration results in a single translational degree of freedom motion of the upright (23) that is in turn controlled by a coil spring (25) and the conventional hydraulic damper within the strut (24).

The multi-link suspension configuration illustrated schematically in FIG. 4 is only one of many different available arrangements. Although in many cases these multi-link configurations closely approximate the motion of a four bar link, more complex kinematics are available allowing the upright (33) to provide self-steering and non-linear movement which is deemed necessary for advanced vehicle dynamic behavior. It is also common for multi-link configurations to be kinematically over-constrained, or locked, with only the rubber bushing compliances allowing the required freedom of motion.

All of the conventional articulated linkages described above possess numerous inherent limitations that include significant complexity, the requirement for substantial and extensive vehicle structure for mounting, considerable cost and a requirement for large packaging volumes to contain their motion. There have been a number of prior art attempts to address these limitations. U.S. Pat. No. 3,578,354 describes a form of vehicle suspension system in which the commonly utilized articulated linkages have been replaced by a hub housing and a pair of radially extending pins that allow slideable movement of the wheel along an axis perpendicular to the spindle axis. The radially extending pins pass through frame supporting arms that are rigidly connected to the main vehicle structure and contain a pair of integrated bushings that allow the desired slideable movement but constrain all other degrees of freedom, with the exception of rotary steering motion if desired. A coil spring is introduced on one of the radially extending pins to absorb shock loads. In this manner the suspension system of U.S. Pat. No. 3,578,354 eliminates all conventional articulating links and their associated packaging volume. The entire suspension motion is contained within the wheel, thereby liberating a significant amount of the vehicle volume for alternative use. The mounting of the frame supporting arms has far more freedom than the connection of conventional articulating links so that structural optimization would be far more effective.

Although this prior art embodiment describes a novel approach to simplifying the suspension system of a vehicle, it does not provide any method of damping the spring motion. Additionally, detailed calculation and a study of existing road vehicle suspension springs illustrate that the spring size and package suggested in U.S. Pat. No. 3,578,354 are unrealistically small. A correctly sized spring would not be capable of fitting in the space provided by this prior art configuration. Finally, this prior art suspension configuration describes an integral tie bar joined to the hub housing that allows the attachment of a steering arm adapted to provide steering of the vehicle. Because the hub housing is configured to move in a predominantly vertical and linear manner and the steering arm would describe an arc from its inner end, a self-steering motion would occur during suspension movement. This form of self-steering phenomenon is generally referred to as toe-steer or bump-steer and is a highly undesirable characteristic that could not be eliminated using the structure described in U.S. Pat. No. 3,578,354.

Some of the limitations of U.S. Pat. No. 3,578,354 are overcome in the prior art configuration claimed in U.S. Pat. No. 6,113,119 which similarly describes a wheel connecting assembly for an automobile comprising a hub, a wheel, a wheel carrier, a support comprising a guide member for guiding the wheel carrier in translational movement relative to the support and a mounting means for mounting the support on the chassis of a vehicle. In a similar manner to U.S. Pat. No. 3,578,354, all of these components are accommodated in a limiting envelope within the wheel of the vehicle. A means for supporting the automobile load transmitted by the support to the wheel carrier is provided which is also contained within the limiting envelope. This supporting means is described as a coil spring but is illustrated to be of a more realistic size and configuration than shown in U.S. Pat. No. 3,578,354. However, the coil spring is packaged at a large offset to the translational motion axis defined by the guide member. This large offset would introduce highly undesirable torque loads to the guide member resulting in friction within the suspension movement that is known by those skilled in the art to seriously degrade performance.

Although this prior art embodiment describes an assembly that allows all the essential function of the suspension to be integrated into the actual interior of the volume within the wheel with a realistic spring package and a method for eliminating bump-steer, it does not provide a conventional damper to control the oscillatory nature of the spring-mass system. Dampers or shock-absorbers as used by the automotive industry are almost exclusively of a hydro-dynamic configuration where a controlling force is generated in response to suspension velocity via some form of variable orifice flow. U.S. Pat. No. 6,113,119 makes reference to electromechanical means to control the deflecting movements of the wheel as an alternative to the spring and damper, but as this method has no current application in the industry, the lack of inclusion of a conventional damper is a significant limitation of this prior art arrangement. Both the steering arrangement and spring position would impart significant frictional loads in the suspension movement which is highly undesirable.

U.S. Pat. No. 6,357,770 describes an "in-wheel suspension" system that permits all or most of the moving suspension components to be mounted within the volume enclosed by the rim of the wheel. The improvement over the prior art described above is that a spring and damping mechanism are included so that fully controlled suspension motion would be possible. The described wheel suspension comprises a hub mounting assembly which comprises a hub/bearing assembly including an axle and bearings. The hub mounting assembly is mounted and connected to a suspension frame by a motion-controlling inter-engaging sliding mount assembly which permits the hub plate to slideably move in a controlled manner. The inter-engaging sliding mount assembly permits motion of the hub plate with one degree of freedom. A spring mechanism is mounted extending between, and connecting to both, the hub plate and the suspension frame and preferably includes a damping device. In this manner a similar motion to the previously described prior art is achieved without the requirement of an articulated linkage and the system includes an integrated spring-damper and can be mounted substantially within the volume of a wheel rim. However, once again, detailed calculation and a study of existing road vehicle suspension springs illustrate that the spring and damper size suggested in U.S. Pat. No. 6,357,770 are unrealistically small. In fact, this prior art description self-professes to be only applicable for light road vehicles such as electric vehicles, human powered vehicles, solar powered vehicles and the like. The configuration would not be suitable for general purpose road going vehicles due to the light duty nature of the inter-engaging sliding mount assembly and the small size of the spring mechanism and damping device. Additionally, this prior art configuration does not describe a methodology for allowing the moving suspension components to be steered which is a significant limitation of this arrangement.

SUMMARY OF THE INVENTION

Accordingly, it would be advantageous to create a suspension system that provides all the advantages of the in-wheel arrangements described in the prior art but without the inherent disadvantages of their inadequate spring and damping configurations and associated deficient steering geometries. An object of the present invention, therefore, is to provide a suspension system that eliminates the articulating linkages of conventional arrangements by packaging the motion control aspect within the vehicle's wheel volume envelope. It would be a significant improvement over the prior art to integrate an adequately sized spring and damper arrangement packaged in such a way as not to impart undesirable loads on the system. Another major advantage would be realized if a steering arrangement was provided that overcame the geometry and friction disadvantages of previous in-wheel suspension systems.

The present invention provides a suspension system for vehicles that comprises an upright that includes a spindle configured to carry a wheel bearing assembly. The bearing assembly is adapted to provide a rotatable mounting for a wheel hub. The wheel hub is provided with a detachable connection for a wheel and tire assembly. The upright also includes a mounting flange for a brake caliper and a fastening means. A strut shaft is rigidly attached to the upright via the fastening means and includes a pumping piston and piston seal. A main housing is configured with a bearing arrangement adapted to guide and support the strut shaft, a sealing system to contain a pumping fluid, a mounting arrangement for attachment to the main vehicle structure and a fluid port. A remote suspension module is configured with a hydraulic actuation piston, an energy storage device and a damping device. The fluid port of the main housing is connected to the hydraulic actuation piston of the remote suspension module via a hydraulic connection so that when the pumping piston of the strut shaft moves within the main housing, the motion is directly transmitted to the hydraulic actuation piston via the pumping fluid. The vehicle's suspension movement is essentially defined as the motion of the wheel and this is constrained to a predetermined path by the guidance of the strut shaft via the bearing arrangement. The predetermined suspension movement is then transmitted to the energy storage device and damping device of the remote suspension module via the pumping fluid. In this way the energy storage device and damping device can be located remotely from the upright, strut shaft and main housing which allows these components to be easily contained within the volume of the wheel. This also allows the entire suspension motion to be contained within the wheel volume thereby liberating a significant amount of the vehicle volume for alternative use as well as eliminating the need for articulating links and their associated structural mounting points.

In a further aspect of the present invention, the main housing is provided with a steering bearing adapted to rotatably mount a steering arm to the main housing in coaxial alignment with the strut shaft. A guide shaft is rigidly attached to the upright in parallel alignment with the strut shaft. The steering arm is configured with a rotational mounting joint for attachment to the steering bearing, a tie rod attachment and a guide joint adapted to translate along the guide shaft. The tie rod end of a typical vehicle steering linkage is connected to the tie rod attachment so that steering motion is translated into rotational motion of the upright and strut shaft around the strut shaft axis. The steering motion is imparted on the upright via the steering arm guide joint acting on the guide shaft. The vehicle's suspension movement is decoupled from the steering arm via the translation of the guide joint along the guide shaft. In this way toe-steer, or bump-steer, is completely eliminated.

In an alternative embodiment of the further aspect of the present invention, the tie rod attachment is connected directly to the main vehicle structure so as to eliminate rotational motion of the upright and strut shaft so that the suspension system can be used for non-steerable applications but toe-steer or bump-steer is still completely eliminated.

In a preferred embodiment of the present invention, the strut shaft is a cylindrical tube that is rigidly attached to the upright at its outer ends via fastening means such as bolted clamps, axial end bolts, or a similar arrangement. The strut shaft is additionally configured with an integrated cylindrical pumping piston that is adapted to be fitted with a circumferential piston seal. The main housing contains a cylindrical inner bore adapted to cooperate with the pumping piston so that a sealed main housing pumping chamber is created that changes volume during relative motion between the strut shaft and main housing. In this way, suspension movement is transmitted to the remote suspension module via the pumping fluid and the motion ratio between the suspension movement and energy storage device can be easily modified.

In a further preferred embodiment of the present invention, the energy storage device of the suspension module is a coil spring and the damping device is a variable orifice arrangement acting directly on the pumping fluid. The hydraulic actuation piston is contained in a closed cylinder and acts on one end of the coil spring. The variable orifice arrangement is located within a valve block that is hydraulically linked to the closed cylinder and also contains a termination for the hydraulic connection. In this manner the suspension movement is directly transmitted to the coil spring via the pumping fluid but the flow is controlled by the variable orifice arrangement. This flow control provides the necessary damping of the suspension movement.

In an alternative embodiment of the present invention, the energy storage device is an enclosed gas volume.

In a further preferred embodiment of the present invention, the variable orifice arrangement that acts as the damping device consists of the unique Dynamic Suspensions Spool Valve (DSSV) configuration produced by Multimatic, Inc. of Markham, Ontario, Canada. The DSSV configuration consists of fixed orifice low speed bump and rebound valves and spool type high speed bump and rebound valves as well as an arrangement of one way valves to properly route the pumping fluid through the correct valves during bump and rebound suspension movement. In a further preferred embodiment of the present invention the DSSV valves are all externally adjustable.

In an alternative embodiment of the present invention, the variable orifice arrangement is a conventional shim stack configuration.

In a further alternative embodiment of the present invention, the damping device is a conventional hydraulic shock absorber utilizing a self-contained hydraulic fluid circuit separate from the pumping fluid. The hydraulic actuation piston acts on one end of the conventional hydraulic shock absorber.

In another alternative embodiment of the present invention, the pumping fluids of the inventive suspension systems on opposite sides of the vehicle can be linked via a coupling, orifice block, floating piston, floating pistons coupled via a spring system or a similar arrangement. In this manner, a form of hydraulic anti-roll device can be created by coupling the suspension movement of opposite sides of the vehicle. This coupling eliminates the requirement for conventional mechanical anti-roll devices. In a similar manner, the pumping fluids of the inventive suspension systems on the front and rear of the vehicle can be linked creating a hydraulic anti-pitch device.

In a further alternative embodiment of the present invention, a hydraulic pump and distribution valve arrangement is configured so as to add to or subtract from the volume of pumping fluid in the inventive suspension system hydraulic circuit. In this manner the relationship between the resting point of the strut shaft and upright can be changed relative to the energy storage device. This allows the static ride height of the vehicle to be altered in a simple and expeditious manner.

Further aspects of the invention will become apparent from the following description.

DETAILED DESCRIPTION OF THE INVENTION

Figure 1:
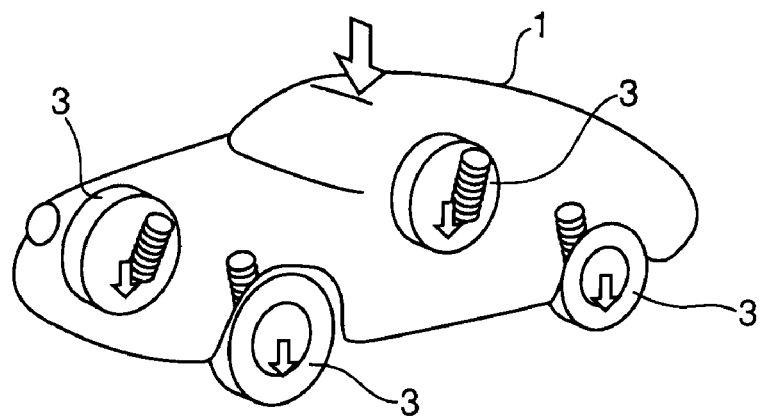
FIG. 1 is a schematic perspective view of a typical vehicle suspension system.
Figure 2:
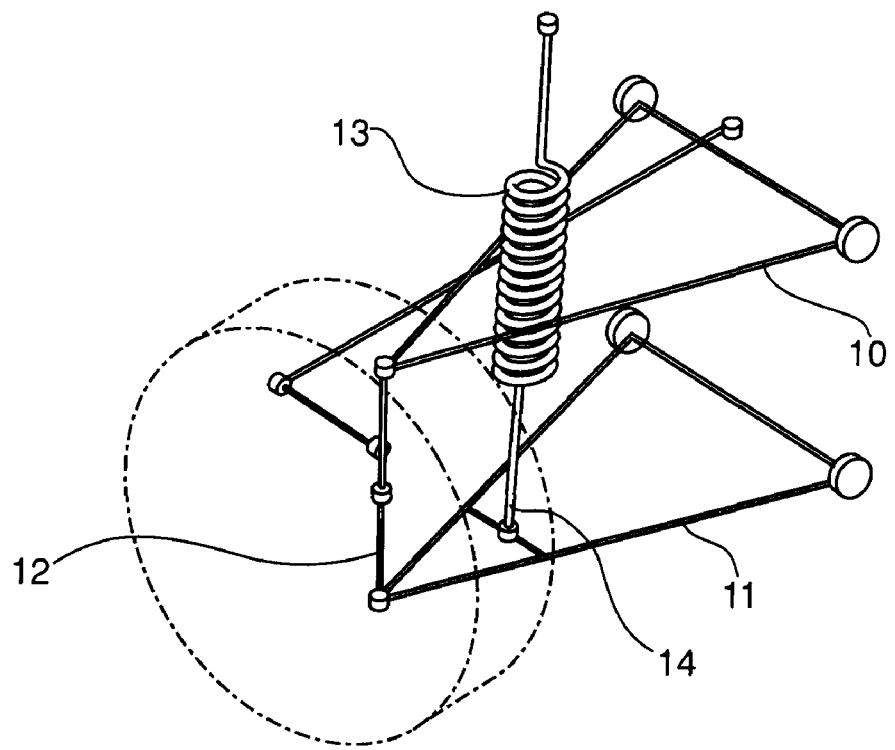
FIG. 2 is a schematic, perspective view of a prior art double "A" arm suspension configuration.
Figure 3:
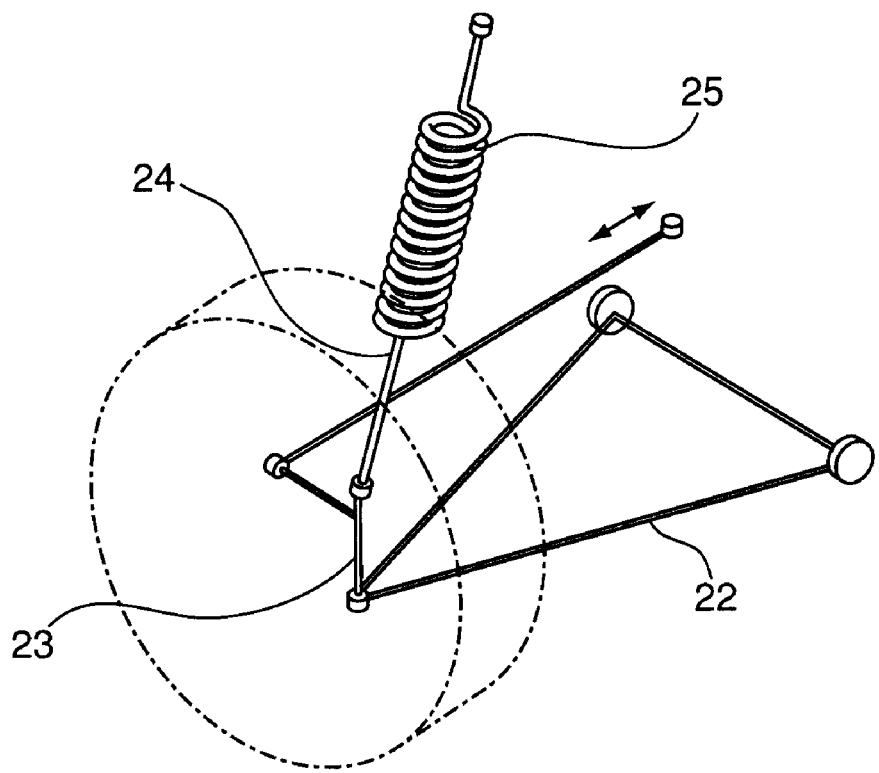
FIG. 3 is a schematic, perspective view of a prior art MacPherson strut suspension configuration.
Figure 4:
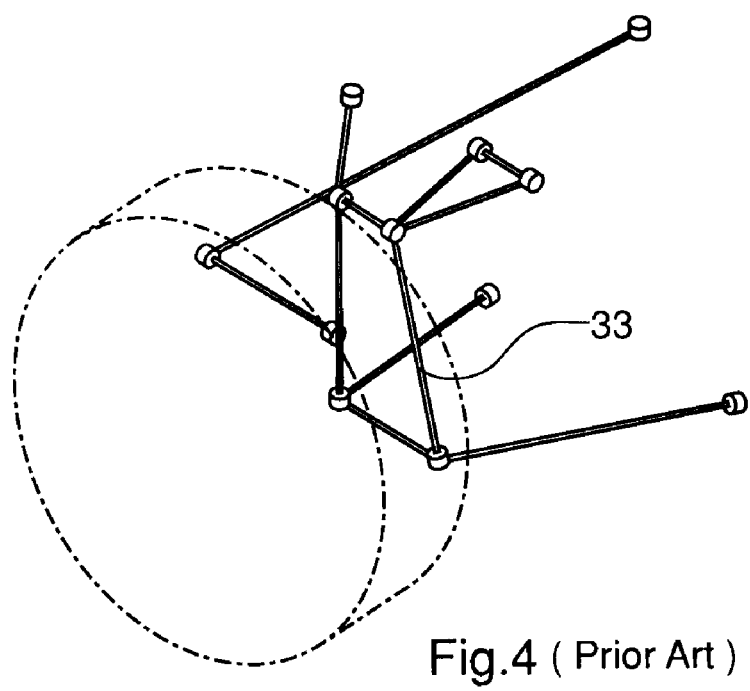
FIG. 4 is a schematic, perspective view of a prior art multi-link suspension configuration.
Figure 5:
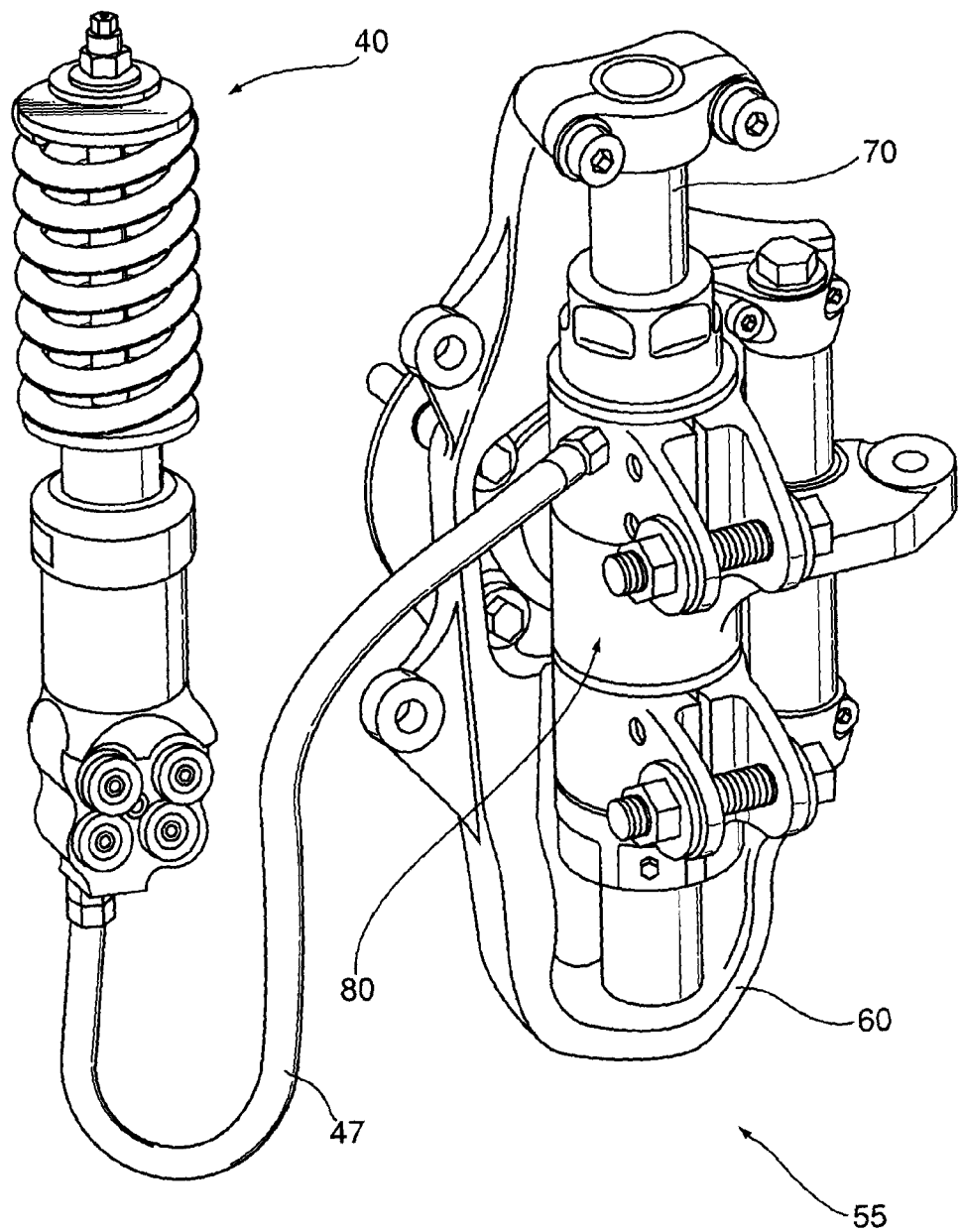
FIG. 5 is a perspective view of the inventive suspension system.
Figure 6:
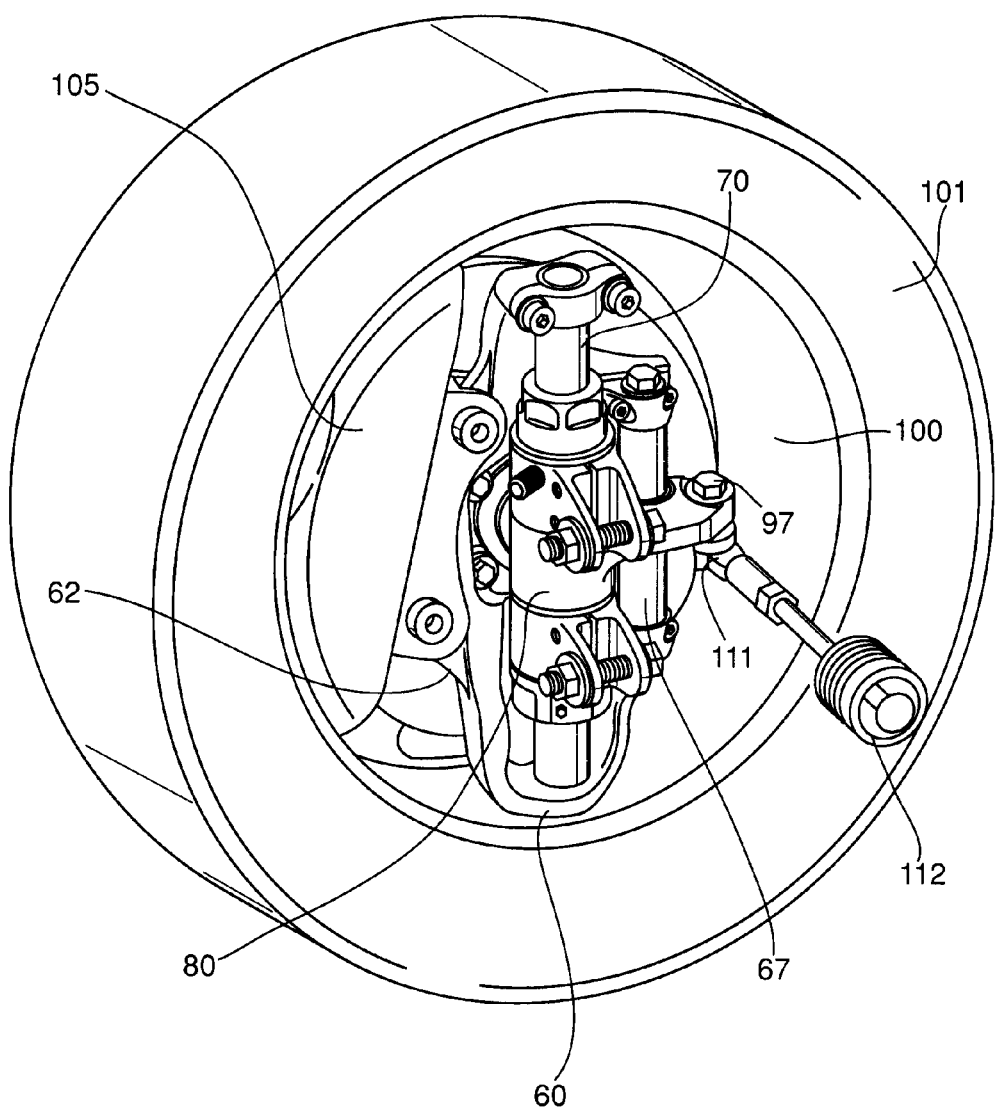
FIG. 6 is a perspective view of the in-wheel components, vehicle wheel and tire of the inventive suspension system.
Figure 7:
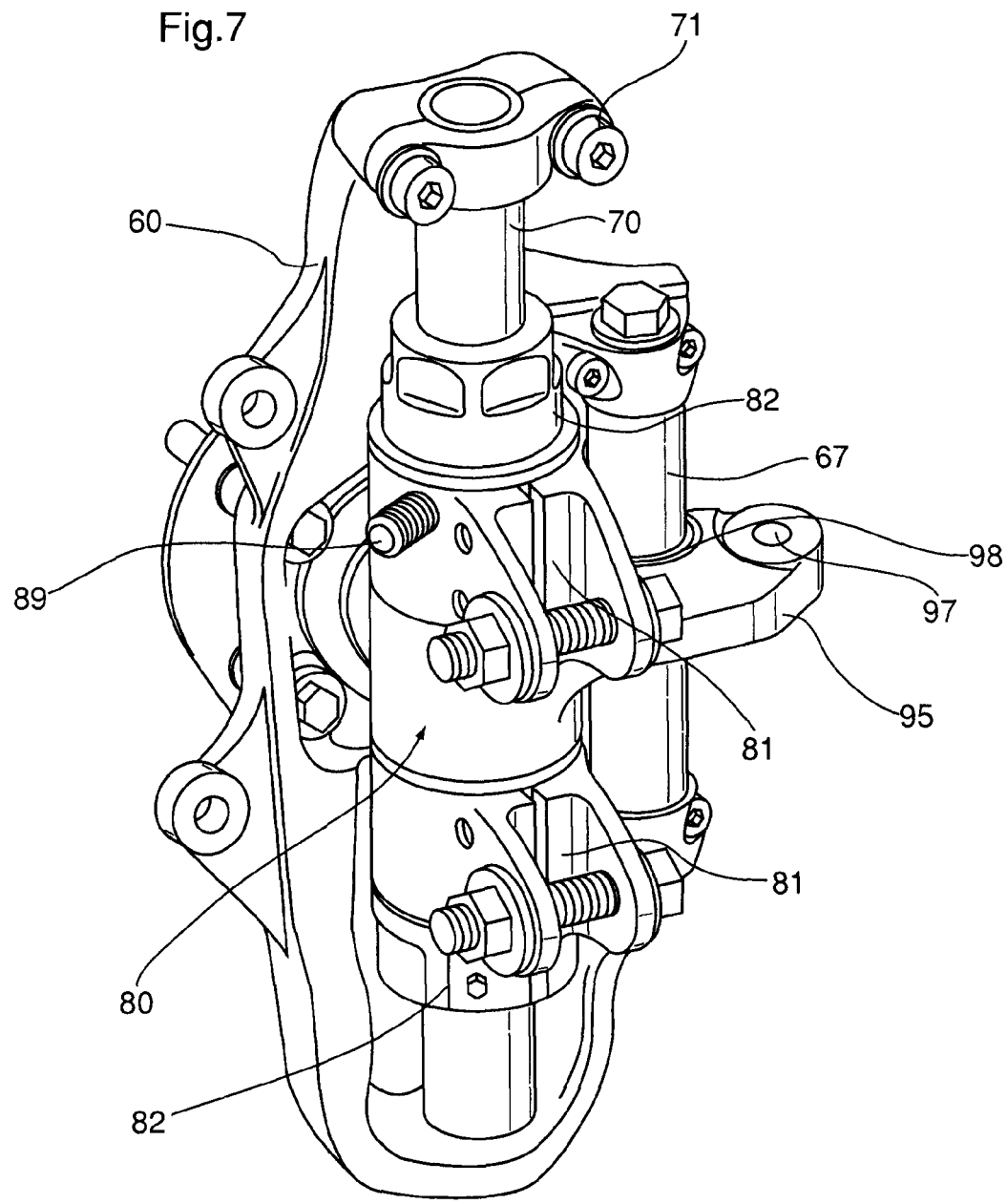
FIG. 7 is a perspective view of the in-wheel components of the inventive suspension system.
Figure 8:
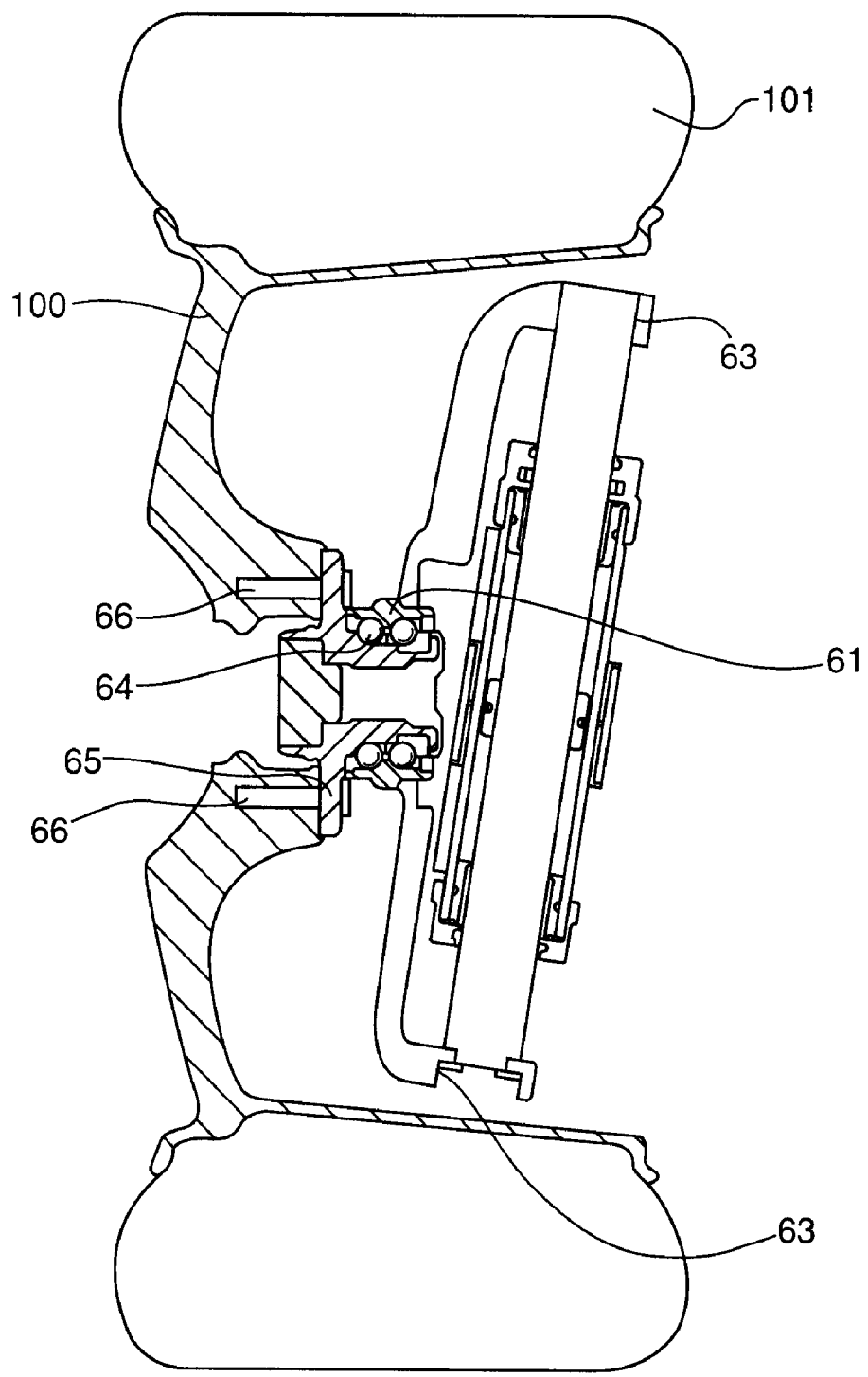
FIG. 8 is a partial sectional view of the upright of the inventive suspension system.
Figure 10:
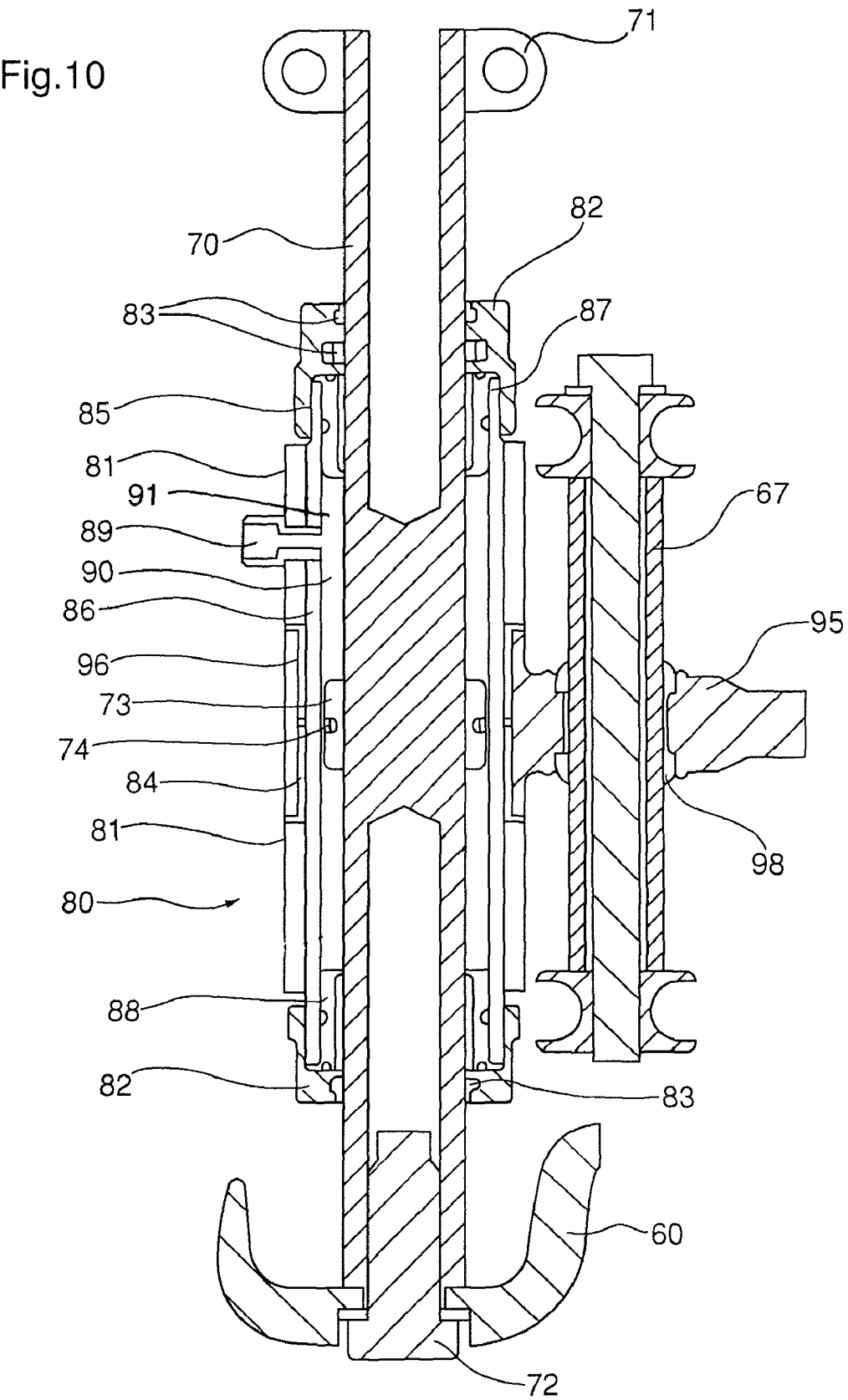
FIG. 10 is partial sectional view of the main housing and strut shaft of the inventive suspension system.

Referring to FIG. 5, a suspension system (55) is substantially constructed from an upright (60), a strut shaft (70), a main housing (80) and a remote suspension module (40). Referring to FIGS. 6 and 8, the upright (60) is configured with a spindle (61), a mounting flange (62) for a brake caliper (105) and a fastening means (63). The spindle (61) is configured to carry a wheel bearing assembly (64) which is adapted for rotatable mounting of a wheel hub (65). The wheel hub (65) additionally includes a detachable connection (66) for a wheel (100) and tire (101) assembly. Referring to FIGS. 7 and 10, the main housing (80) is substantially constructed from a pressure tube (86) a pair of removable seal caps (82) and a mounting arrangement (81) for attachment to a main vehicle structure. The seal caps (82) contain a sealing system (83), and a threaded retention aspect (85) configured to interact with a matching pressure tube thread (87), and are adapted to retain a bearing arrangement (88). The main housing (80) also includes a fluid port (89) that passes from a main housing pumping chamber (90) through both the pressure tube (86) and mounting arrangement (81). The main housing pumping chamber (90) is substantially a cylindrical volume created by the inner bore of the pressure tube (86) and outer surface of the strut shaft (70) and contains a pumping fluid (91). The strut shaft (70) comprises a cylindrical tube that is rigidly attached to the fastening means (63) of the upright (60) at its upper end via a bolted clamp (71) and at its lower end by an axial end bolt (72). The strut shaft (70) is additionally configured with an integrated cylindrical pumping piston (73) that is adapted to be fitted with a circumferential piston seal (74).

Figure 9:
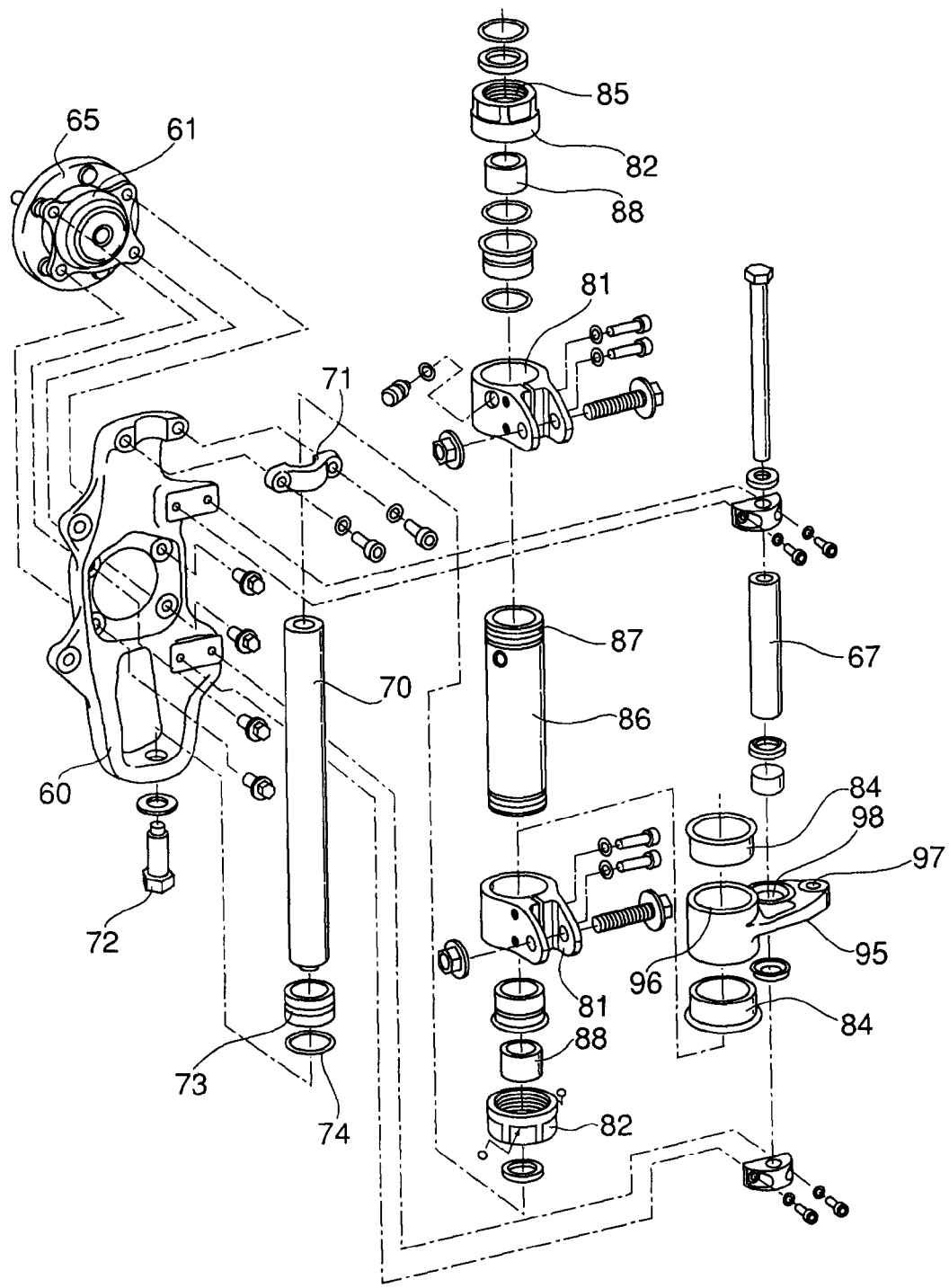
FIG. 9 is an exploded perspective view of the in-wheel components of the inventive suspension system.

Referring to FIGS. 6 and 9, the main housing (80) is additionally provided with a steering bearing (84) that is adapted to rotatably mount a steering arm (95) in coaxial alignment with the strut shaft (70). A guide shaft (67) is rigidly attached to the upright (60) in parallel alignment with the strut shaft (70). The steering arm (95) is configured with a rotational mounting joint (96) for attachment to the steering bearing (84), a tie rod attachment (97) and a guide joint (98) adapted to translate along the guide shaft (67). The tie rod end (111) of a typical vehicle steering linkage (112) is connected to the tie rod attachment (97).

Figure 11:
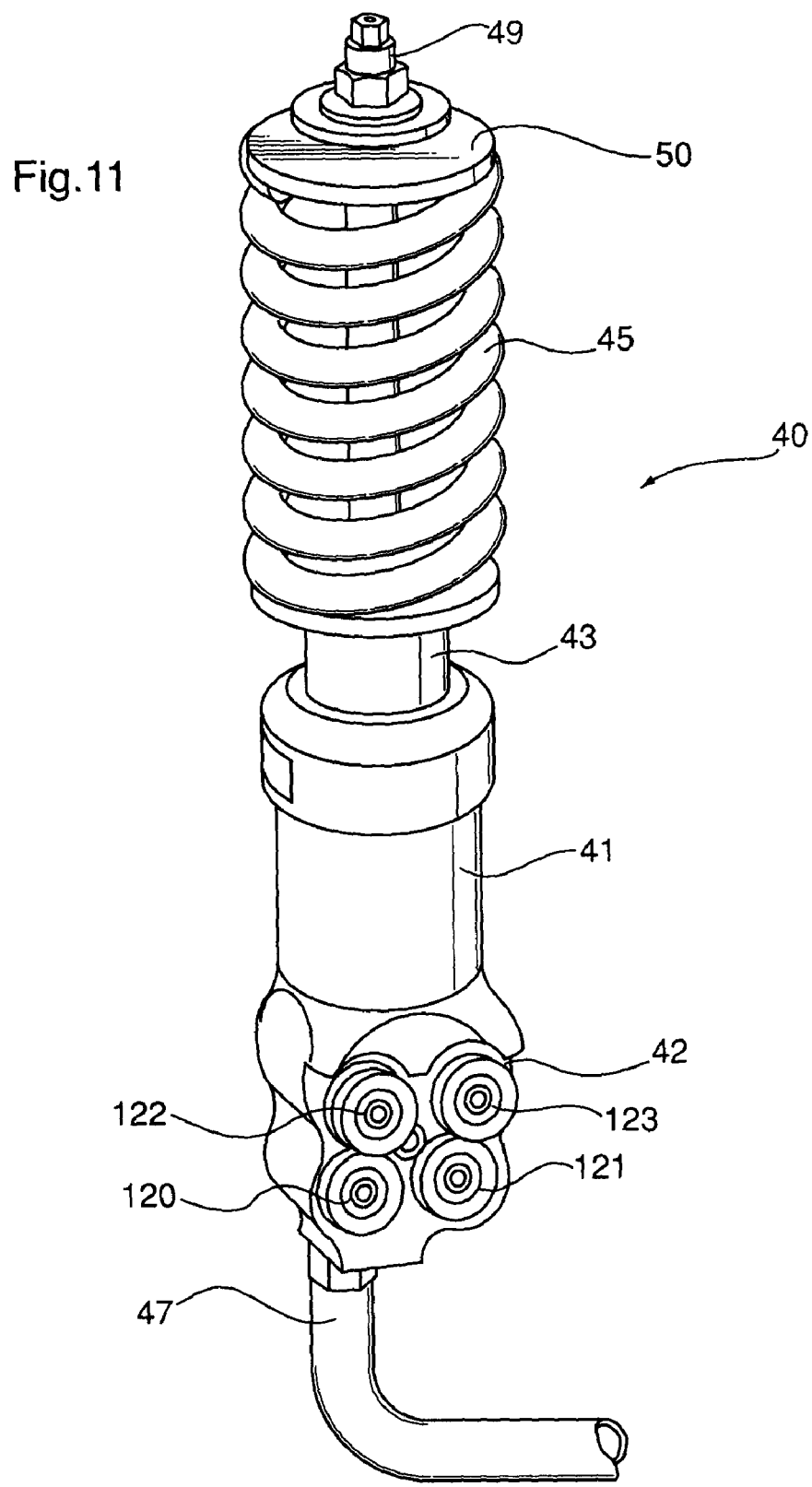
FIG. 11 is a perspective view of the suspension module components of the inventive suspension system.
Figure 12:
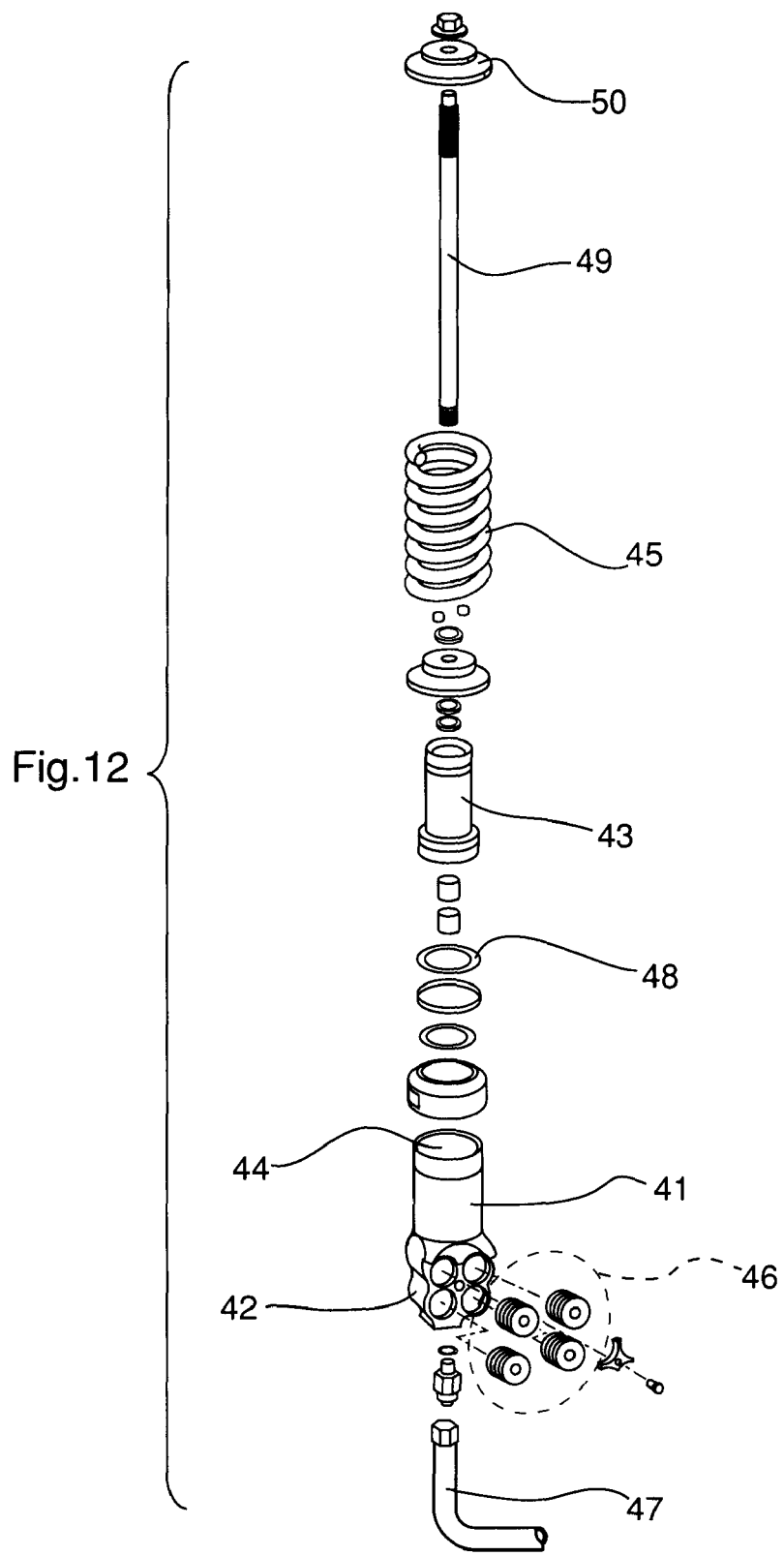
FIG. 12 is an exploded perspective view of the suspension module components of the inventive suspension system.

Referring to FIGS. 11 and 12, the remote suspension module (40) comprises a main body (41) that is configured with a valve block (42) and a closed cylinder (44). A hydraulic actuation piston (43) is adapted to fit within the closed cylinder (44) and is configured with an actuation piston seal (48). A hydraulic connection (47) consisting of a rigid pipe and associated fittings connects the fluid port (89) of the main housing (80) (illustrated in FIGS. 7 and 10) to the valve block (42). A standard variable orifice arrangement (46) is contained within the valve block (42) arranged in the hydraulic circuit between the hydraulic connection (47) and the closed cylinder (44). The hydraulic actuation piston (43) is adapted to act directly on one end of a coil spring (45). A retention rod (49) and spring platform (50) retain the coil spring (45) at the end of the coil spring opposite the hydraulic actuation piston (43).

Referring to FIGS. 5, 7 and 10, when the suspension system (55) encounters a bump, the wheel motion is constrained to a predetermined path by the guidance of the strut shaft (70) in the bearing arrangement (88). This predetermined suspension movement results in relative motion between the pumping piston (73) of the strut shaft (70) and the main housing (80). This relative motion causes the main housing pumping chamber (90) to change volume which in turn forces the pumping fluid (91) in and out of the fluid port (89). Referring again to FIGS. 11 and 12, the displaced pumping fluid (91) is transmitted to the closed cylinder (44) of the remote suspension module (40) via the hydraulic connection (47) and the valve block (42) and its associated variable orifice arrangement (46). The displaced pumping fluid (91) entering or leaving the closed cylinder (44) acts directly on the hydraulic actuation piston (43) resulting in translational motion of the coil spring (45). In this way, suspension movement is constrained to a predetermined single degree of freedom motion which is then controlled by the coil spring (45), which stores imparted energy and the variable orifice arrangement (46) which acts as a damper or shock absorber to control the oscillatory nature of the spring-mass system. Because the remote suspension module (40) is remotely located from the upright (60), strut shaft (70) and main housing (80) (see FIG. 5), these motion control components can be easily contained within the volume of the wheel (100) (see FIGS. 6 and 8). This also allows the entire suspension motion to be contained within the wheel volume thereby liberating a significant amount of the vehicle volume for alternative use.

Referring to FIGS. 6 and 9, when steering motion is imparted on the tie rod attachment (97) of the steering arm (95) by the tie rod end (111) of the typical vehicle steering linkage (112) the steering arm (95) rotates on the steering bearing (84) around the axis of the strut shaft (70). The rotation of the steering arm (95) at its rotation mounting joint (96) is translated to the strut shaft (70) and upright (60) via the steering arm guide joint (98) acting on the guide shaft (67). In this way the vehicle wheel (100) and tire (101) can be conventionally steered via a typical vehicle steering linkage (112). Because the vehicle's suspension movement is decoupled from the steering arm (95) via the translation of the guide joint (98) along the guide shaft (67), toe-steer or bump-steer is completely eliminated.

In an alternative embodiment of the present invention, the tie rod attachment (97) of the steering arm (95) is connected directly to the main vehicle structure (1), instead of to the steering linkage (112), so as to eliminate rotational motion of the upright (60) and strut shaft (70) so that the suspension system (55) can be used for non-steerable applications, but toe-steer or bump-steer is still completely eliminated.

In a preferred embodiment of the present invention, the variable orifice arrangement (46) that acts as the damping device consists of the unique Dynamic Suspensions Spool Valve (DSSV) configuration available from Multimatic, Inc. of Markham. Ontario, Canada. As illustrated in FIG. 11, the DSSV configuration consists of a fixed orifice low speed bump valve (120), a fixed orifice low speed rebound valve (121), a spool type high speed bump valve (122), a spool type high speed rebound valve (123) and an arrangement of one way valves to properly route the pumping fluid (91) through the correct valves during bump and rebound suspension movement. In a further preferred embodiment of the present invention, the DSSV low speed bump valve (120), low speed rebound valve (121), high speed bump valve (122), and high speed rebound valve (123) are all externally adjustable.

Figure 13:
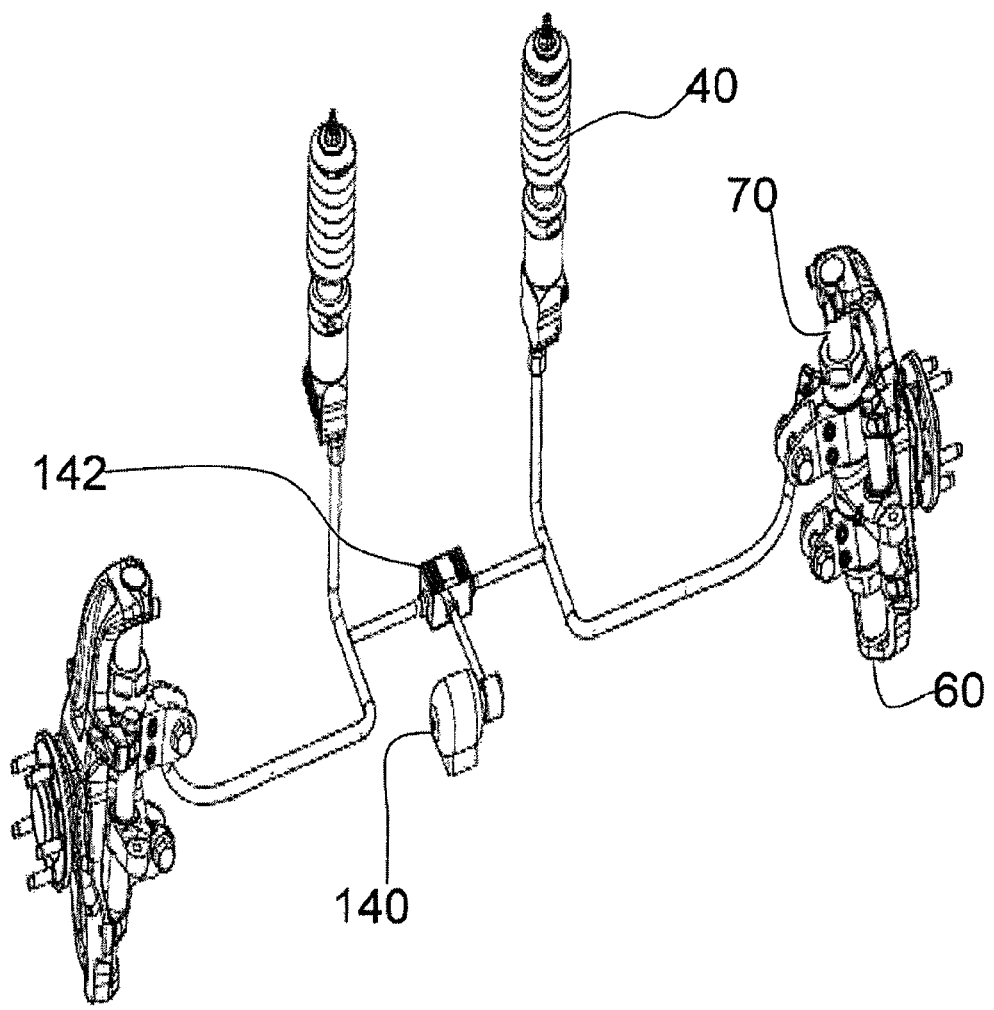
FIG. 13 is a perspective view of a further alternative embodiment of the inventive suspension system.

FIG. 13 depicts a further alternative embodiment of the present invention with a hydraulic pump (140) and distribution valve arrangement (142) configured so as to add or subtract from the volume of pumping fluid in the suspension system hydraulic circuit. In this manner, the relationship between the resting point of the strut staff (70) and the upright (60) can be changed relative to the remote suspension module (40). This allows the static ride height of the vehicle to be altered in a simple and expeditious manner.

The invention claimed is:
1. A suspension system for vehicles having a main vehicle structure, comprising:
   a) an upright adapted to provide a rotatable mounting for a wheel hub configured to carry a wheel and a mounting for a brake caliper, and including a fastening means;
   b) a strut shaft that includes a pumping piston and at least one mounting point adapted for rigid attachment to the fastening means;

c) a main housing configured with a bearing arrangement adapted to guide and support the strut shaft, a sealing system to contain a pumping fluid, a mounting arrangement for attachment to the main vehicle structure and a fluid outlet port;

d) a remote suspension module configured with a hydraulic actuation piston, an energy storage device and a damping device;

e) a hydraulic connection between the fluid outlet port of the main housing and the hydraulic actuation piston of the remote suspension module;

wherein the wheel is constrained to a predetermined motion by the bearing arrangement guiding the strut shaft and wherein this motion is transmitted to the energy storage device and damping device of the remote suspension module via the pumping fluid, and wherein the upright, strut shaft and main housing are all contained within a volume of the wheel.

2. The suspension system of claim 1, wherein the main housing is provided with a steering bearing adapted to rotatably mount a steering arm in coaxial alignment with the strut shaft, and the steering arm is configured with a tie rod attachment connected to the tie rod end of a typical vehicle steering linkage, and a steering arm guide joint adapted to translate along a guide shaft that is rigidly attached to the upright, in parallel alignment with the strut shaft, so that steering motion at the tie rod attachment can be imparted on the upright via the steering arm guide joint acting on the guide shaft.

3. The suspension system of claim 2, wherein the tie rod attachment is connected to the main vehicle structure so as to eliminate rotational motion of the upright and strut shaft.

4. The suspension system of claim 1, wherein the strut shaft is a cylindrical tube with two ends that is rigidly attached to the upright at its ends and is configured with an integrated cylindrical pumping piston that is fitted with a piston seal and is adapted to cooperate with a cylindrical inner bore within the main housing so as to create a sealed pumping chamber in the main housing that contains the pumping fluid and changes volume during relative motion between the strut shaft and main housing.

5. The suspension system of claim 1, and wherein the remote suspension module is configured with a closed cylinder that is adapted to cooperate with the hydraulic actuation piston to create a sealed actuation chamber that contains the pumping fluid, wherein the energy storage device comprises two ends, and the hydraulic actuation piston acts on one end of the energy storage device.

6. The suspension system of claim 5, wherein the energy storage device of the suspension module is a coil spring and the damping device is a variable orifice arrangement acting directly on the pumping fluid.

7. The suspension system of claim 6, wherein the variable orifice arrangement that acts as the damping device comprises multiple valves comprising a fixed orifice low speed bump valve, a fixed orifice low speed rebound valve, a spool type high speed bump valve, a spool type high speed rebound valve and an arrangement of one way valves to route the pumping fluid through the correct valves during bump and rebound suspension movement.

8. The suspension system of claim 7, wherein the multiple valves are externally adjustable.

9. The suspension system of claim 6, wherein the variable orifice arrangement is a conventional shim stack configuration.

10. The suspension system of claim 5, wherein the energy storage device of the remote suspension module comprises an enclosed gas volume.

11. The suspension system of claim 5, wherein the damping device is a conventional hydraulic shock absorber with two ends which utilizes a self-contained hydraulic fluid circuit and the hydraulic actuation piston acts on one end of the conventional hydraulic shock absorber.

12. A vehicle comprising multiple wheels and an individual suspension system as described in claim 1 associated with each wheel, wherein the vehicle has two opposite sides, a front and a rear, and wherein at least two wheels are located on the opposite sides of the vehicle, and wherein the pumping fluid in the suspension systems on the opposite sides of the vehicle are linked via a coupling, orifice block, floating piston, floating pistons coupled via compliance, or by a similar arrangement.

13. A vehicle comprising multiple wheels and an individual suspension system as described in claim 1 associated with each wheel, wherein the vehicle has two opposite sides, a front and a rear, and wherein at least two wheels are located respectively at the front and rear of the vehicle, and wherein the pumping fluid in the suspension systems at the front and rear of the vehicle are linked via a coupling, orifice block, floating piston, floating pistons coupled via compliance, or by a similar arrangement.

14. The suspension system of claim 1, wherein the pumping fluid is enclosed in a hydraulic circuit and wherein a hydraulic pump and distribution valve arrangement is configured so as to add to or subtract from the volume of pumping fluid in the hydraulic circuit.

* * * * *